1-(ω-BENZOYLALKYL)-3-SUBSTITUTED PYRROLIDINES

Carl Dalton Lunsford, William John Welstead, Jr., and Grover Cleveland Helsley, Richmond, Va., assignors to A. H. Robins Company, Incorporated, Richmond, Va.
No Drawing. Continuation-in-part of application Ser. No. 592,263, Nov. 7, 1966. This application Apr. 14, 1969, Ser. No. 816,119
Int. Cl. C07d 27/04
U.S. Cl. 260—326.5 J   9 Claims

ABSTRACT OF THE DISCLOSURE

Novel 1-(ω-benzoylalkyl)-3 - substituted pyrrolidines possessing central nervous system depressant activity and analgetic activity are disclosed. The compounds are prepared from γ-halobutyrophenones, β-(di-lower alkylamino)propiophenones and 3-substituted pyrrolidines.

---

The present application is a continuation-in-part of copending application Ser. No. 592,263 filed Nov. 7, 1966, now abandoned.

This invention relates to novel 1,3-disubstituted pyrrolidines. In particular, this invention relates to 1-(ω-benzoylalkyl)-3-substituted pyrrolidines and processes for the preparation thereof, therapeutic compositions containing the same as active ingredients and methods of making and using them.

The 1-(ω-benzoylalkyl)-3-substituted pyrrolidines of the present invention may be represented structurally as follows:

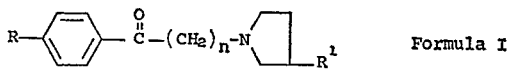

Formula I wherein:

R represents hydrogen and fluorine,
$R^1$ represents —N($R^2$)phenyl, —C(OH)($R^2$)phenyl and phenyl, wherein:

$R^2$ represents hydrogen, lower-alkyl and lower alkanoyl, n is an integer from 2 to 3 inclusive, wherein phenyl is the unsubstituted phenyl radical and the monosubstituted phenyl rarical, and pharmaceutically acceptable acid-addition salts thereof.

The 1-(ω-benzoylalkyl)-3-substituted pyrrolidines of Formula I wherein n is 3 can be advantageously prepared by the condensation of a γ-halobutyrophenone of Formula II:

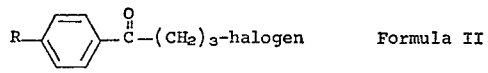

Formula II with a pyrrolidine of Formula III:

Formula III wherein R and $R^1$ are defined as above.

The condensation can be carried out in an inert solvent such as an aromatic hydrocarbon as, for example, benzene, toluene or xylene, a lower alkanol as, for example, ethanol, propanol, butanol or isobutanol, or a lower alkanone as, for example, 2-butanone. The halogen in Formula II can be chlorine, bromine or iodine and the condensation is preferably run at a temperature of from about 60° C. to about 135° C. dependnig on the solvent used. A reaction time of from about 48 hours to about 80 hours is usually necessary to complete the reaction. The course of the reaction can be followed by thin layer chromatography. Generally speaking, condensations run for shorter periods of time or at lower temperatures result in lower yields of the final products.

The yields of the reaction disclosed hereinabove can be markedly increased by employing γ-halobutyrophenones of Formula II as their ketals, i.e., as 2-phenyl-2-(ω-halopropyl)-1,3-dioxolanes; intramolecular dehydrohalogenation which occurs to a marked degree when the free ketone is used is thereby minimized. Subsequent to the condensation, the ketone group is regenerated by mild acid hydrolysis.

The 1-(ω-benzoylalkyl)-3-substituted pyrrolidines of Formula I, wherein n is 2 are prepared by reacting a β-(di-lower-alkylamino)propiophenone of Formula IV:

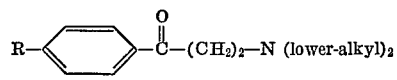

Formula IV wherein the lower alkyl radicals are preferably methyl or ethyl and R is as defined above with a pyrrolidine of Formula III, wherein $R^1$ is as defined above

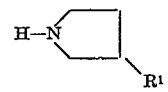

Formula III in a solvent inert to the reactants or the reaction product while a current of dry nitrogen is bubbled through the reaction medium. The pyrrolidine radical displaces the di-lower-alkyl amine moiety from the β-(di-lower-alkylamino)propiophenone. Examples of solvents which can be used are dimethylformamide, benzene, toluene, xylene and the like. Dimethylformamide is especially preferred as a solvent. The reaction can be carried out from about room temperature to about 80° C., the preferred reaction temperature being from about 45° C. to about 65° C. Reactions carried out below the preferred temperature range result in abnormally long reaction times while reactions carried out above the preferred temperature range result in a loss of solvent being swept out of the reaction system by the nitrogen. The current of nitrogen sweeps out the displaced di-lower-alkyl amine, thereby aiding the reaction rate by shifting the equilibrium of the reaction in the direction of the formation of the reaction product. After the reaction is completed, the reaction mixture is partitioned between water and an organic solvent as, for example, benzene. The organic layer is washed with water, dried and then concentrated. The crude reaction product remaining after evaporation of the solvent is purified by crystallization, distillation, chromatography or by similar suitable procedures. It can also be converted to a suitable acid addition salt which can be further purified by crystallization.

The compounds represented by Formula I are useful because they possess pharmacological activity. In particular, the compounds of Formula I wherein n is 3 are central nervous system depressants and can be used as tranquilizers, while the compounds of Formula I wherein n is 2 ameliorate pain and can be used as analgetics. The central nervous system depressant activity was demonstrated by the isolation-induced aggressive behavior method of DaVanzo, J. P. et al Psychopharmacologia 9, 210 (1966) using male albino mice. Each compound was given to groups of 5 mice at 20 mg./kg. intraperitoneally. The analgetic activity was determined in female mice (ICR strain) by a modification [Helsley, G. C. et al. J. Med. Chem., 11, 472 (1968)] of the method of Nilsen, P. Acta. Pharmacol. Toxicol., 18, 10 (1961). Each compound was given to groups of 5 mice at 20 mg./kg. intraperitoneally.

| Example | CNS depressant Fighting mouse assay | |
|---|---|---|
| | Mg./kg., i.p. | Number protected/number tested |
| 1 | 20 | 2:5 |
| 4 | 20 | 2:5 |
| 5 | 20 | 2:5 |
| 6 | 20 | 2:5 |
| 7 | 20 | 5:5 |
| 8 | 20 | 1:3 |
| 12 | $ED_{50}=13$ | |

| | Analgetic activity | | |
|---|---|---|---|
| | Number analgetic/ number tested | $ED_{50}$, mg./kg. | Toxic range, mg./kg. |
| 15 | 5:5 | 0.5(0.2-1.1) | 80-160 |
| 17 | 4:5 | | 80-160 |

The $ED_{50}$ was determined by the method of J. Litchfield and F. Wilcoxon, J. Pharmacol. Exptl. Therap., 96, 99 (1949).

It is, therefore, an object of the present invention to provide novel compounds having valuable therapeutic properties. Another object is to provide novel compounds for the purposes of combating anxiety and ameliorating pain. A further object is to provide novel compositions comprising the compounds which possess beneficial tranquilizing activity and analgetic activity. Additional objects will be apparent to one skilled in the art and still other objects will become apparent hereinafter.

The foregoing and additional objects are accomplished by the provision of certain novel 1-(ω-benzoylalkyl)-3-substituted pyrrolidines, pharmaceutically acceptable acid-addition salts thereof, and compositions containing the same as active ingredients.

In the definition of the symbols in the foregoing Formula I and where they appear elsewhere throughout the specification and claims thereof, the terms used herein have the following significance.

The term "lower alkyl" includes straight and branched chain radicals of up to eight carbon atoms inclusive and is exemplified by such groups as methyl, ethyl, propyl, isopropyl, butyl, isobutyl, tertiary butyl, amyl, isoamyl, hexyl, heptyl, octyl, and the like. The term "lower alkoxy" has the formula —O—lower alkyl.

The "phenyl" radical refers to the unsubstituted phenyl radical and to the monosubstituted phenyl radical, said substituent being any radical not reactive or otherwise interfering under the conditions of reaction in preparing the desired compound, such radicals including lower alkoxy, lower alkyl, trifluoromethyl, halo, and the like. The substituents can be in various available positions of the phenyl nucleus.

The term "benzoyl" has the formula

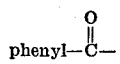

The term "lower alkanoyl" has the formula

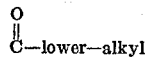

The compounds of the invention are most conveniently employed in the form of non-toxic pharmaceutically acceptable acid-addition salts which have improved water solubility over the free base. Although the non-toxic salts are preferred, any salt may be prepared for use as a chemical intermediate, as in the preparation of another acid-addition salt suitable for administration to an animal body for the desired physiological effect thereof. The free basic compounds of Formula I may be conveniently converted to their acid-addition salts by reaction of the free base with the selected acid, preferably in the presence of an organic solvent inert to the reactants and reaction products under the conditions of the reaction. The acids which can be used to prepare the preferred non-toxic acid-addition salts are those which produce, when combined with the free bases, salts, the anions of which are relatively innocuous to the animal organism in therapeutic doses of the salts, so that the beneficial physiological properties inherent in the free bases are not vitiated by side effects ascribable to the anions.

Appropriate acid-addition salts are those derived from mineral acids such as hydrochloric acid, hydrobromic acid, hydroiodic acid, nitric acid, sulfuric acid, and phosphoric acid and organic acids such as acetic acid, citric acid, lactic acid, fumaric acid, and tartaric acid. The preferred acid-addition salt is the hydrochloride.

The acid-addition nalts are prepared either by dissolving the free base in an aqueous solution containing the appropriate acid and isolating the salt by evaporating the solution, or by reacting the free base and the selected acid in an organic solvent, in which case the salt ordinarily separates directly or can be conventionally recovered by concentration of the solution or the like. Conversely, the free base may be obtained conventionally by neutralizing the acid-addition salt with an appropriate base such as ammonia, ammonium hydroxide, sodium carbanote or the like, extracting the liberated base with a suitable solvent, illustratively ethyl acetate or benzene, drying the extract and evaporating to dryness or fractionally distilling or in other conventional manner.

PREPARATION OF INTERMEDIATES

α,α-Disubstituted-3-pyrrolidinemethanols

A 1-benzyl-3-cyanopyrrolidine (U.S. Pat. 3,318,908) is reacted with phenylmagnesium halide in anhydrous ether to give 1-benzyl-3-benzoylpyrrolidine. The isolated and purified benzoyl pyrrolidines thus obtained are further reacted in anhydrous ether with various Grignard reagents to give 1-benzyl - α,α - disubstituted-3-pyrrolidinemethanols. The benzyl radical is subsequently removed by hydrogenolysis using palladium-on-charcoal catalyst.

In a second and preferred method, a 1-benzyl-2-pyrrolidinone is reacted in liquid ammonia containing at least one equivalent of an alkali metal amide condensing agent such as lithium amide with a ketone to give a 1-benzyl-2-oxo-α,α-disubstituted - 3 - pyrrolidinemethanol. Other alkali metal amides such as sodium amide and potassium amide can equally be used. The ketone can be an alkyl ketone, a phenyl alkyl ketone, or a diphenyl ketone. The 2-oxo group is reduced by a complex metal hydride, illustratively, lithium aluminum hydride, thereby yielding a 1-benzyl-α,α-disubstituted-3-pyrrolidinemethanol. After a suitable purification step such as crystallization, distillation, or the like, the benzyl radical is removed as in the first method by hydrogenolysis using a palladium-on-charcoal catalyst.

3-phenylpyrrolidines

A 1-benzyl-3-pyrrolidinone is reacted with a phenylmagnesium halide to give a 1-benzyl-3-phenyl-3-pyrrolidinol. The 3-pyrrolidinol compound thus obtained is treated with a dehydrating agent which may be a mineral acid as, for example, dilute hydrochloric acid or an organic acid as, for example, benzenesulfonic acid to split out the elements of water and yield the corresponding 1-benzyl-3-phenyl pyrroline. The double bond and the benzyl group in the pyrroline can be respectively reduced and removed by hydrogenolysis by shaking a solution of the compound in an alcohol as, for example, ethanol, in an atmosphere of hydrogen in the presence of palladium-on-charcoal catalyst.

In a further aspect of the aforementioned procedure, it has been found that it is only necessary to shake a mixture of a 3-pyrrolidinol compound in an alcohol solution which has been acidified with a mineral acid as, for example, hydrochloric acid, in an atmosphere of hydrogen

3-anilinopyrrolidines 3-anilinopyrrolidines can be prepared as disclosed in copending United States application Ser. No. 536,316, filed Mar. 22, 1966, now abandoned.

As a general procedure a 1-benzyl-3-pyrrolidinol is converted to its tosylate by treating a stirred solution of the sodium salt of the pyrrolidinol in a dry organic solvent as, for example, toluene, at a temperature from about 0° C. to about 15° C. with p-toluenesulfonyl chloride. The reaction mixture is washed with water and dried. The stirred dried toluene solution is heated to about 80° C. and then treated with aniline or a substituted aniline. After refluxing the mixture from about two hours to about eight hours, the mixture is cooled and after washing and drying, the solvent is stripped and the residue distilled in vacuo. Other sulfonate esters can equally be used and include those prepared using benzenesulfonyl chloride or an alkyl ester such as that obtained when ethylsulfonyl chloride is used. The 1-benzyl-3-anilinopyrrolidine thus obtained is shaken in an atmosphere of hydrogen using palladium-on-charcoal to remove the benzyl radical attached to the pyrrolidine nitrogen by hydrogenolysis.

A second procedure which can equally be used is the addition of aniline or a substituted aniline to maleimide at a temperature from about 50° C. to about 140° C. as disclosed in U.S. Pat. 3,433,802. The 3-substituted maleimide is reduced by metal hydride reduction using, for example, lithium aluminum hydride to the desired 3-anilino pyrrolidine.

ω-Haloalkylbutyrophenones

The intermediates of Formula II used in the present invention are available from commercial sources or can be prepared by the method of Close, J. Am. Chem. Soc., 79, 1455 (1957) or by the procedures disclosed in Belgium Pat. 577,977.

PREPARATION 1

1-benzyl-α-ethyl-α-phenyl-3-pyrrolidinemethanol

In a three-liter, three-necked flask equipped with a stirrer, dropping funnel and efficient reflux condenser (system under nitrogen) were placed 36.5 g. (1.5 moles) of magnesium turnings, 500 ml. of dry ether and a crystal of iodine. After several milliliters of a solution of 234 g. (1.5 moles) of ethyl iodide in 200 ml. of dry ether was added, the reaction started and the remainder of the solution was added at a rate which maintained vigorous refluxing. After the addition was complete, stirring and refluxing were continued for one hour. To the stirred Grignard solution was added a solution of 128 g. (0.48 mole) of 3-benzoyl-1-benzylpyrrolidine in 200 ml. of dry ether at a rate which maintained gentle refluxing. Stirring and refluxing was continued for two hours after the addition was complete. The mixture was cooled and treated slowly with a solution of 70.3 g. (1.5 moles) of ammonium chloride in 500 ml. of water. The ether layer was separated and the aqueous suspension extracted several times with ether. After the combined extracts were washed with water and dried over magnesium sulfate, the solvent was evaporated. The residual oil was distilled at reduced pressure and the fraction distilling at 155–157° C./.01 mm. collected. The light yellow oil weighed 116 g. (82% yield). Thirty-five grams of the product was redistilled slowly and the fraction distilling at 147–148° C./.01 mm. collected. The light yellow oil weighed 28.3 g.; $n_D^{23}$ 1.5637.

Analysis. — Calculated for $C_{20}H_{25}NO$ (percent): C, 81.31; H, 8.53; N, 4.74. Found (percent): C, 81.16; H, 8.36; N, 4.81.

PREPARATION 2

1-benzyl-α-methyl-α-phenyl-3-pyrrolidine methanol

In the same manner as Preparation 1 and substituting methylmagnesium bromide for ethylmagnesium bromide, 1 - benzyl-α-methyl-α-phenyl-3-pyrrolidinemethanol (B.P. 148–150° C./.02 mm.) was prepared in 63% yield.

Analysis. — Calculated for $C_{19}H_{23}NO$ (percent): C, 81.10; H, 8.24; N, 4.98. Found (percent): C, 81.25; H, 8.27; N, 4.75.

PREPARATION 3

1-benzyl-α-methyl-α-(p-trifluoromethylphenyl)-3-pyrrolidinemethanol

In the same manner as Preparation 1, 1-benzyl-3-(p-trifluoromethylbenzoyl) - pyrrolidine and methylmagnesium bromide were reacted to give 1-benzyl-α-methyl-α-(p-trifluoromethylphenyl)-3-pyrrolidinemethanol (B.P. 145–147° C./0.005 mm.) in 55% yield.

Analysis.—Calculated for $C_{20}H_{22}F_3NO$ (percent): C, 68.75; H, 6.35; N, 4.01. Found (percent): C, 68.86; H, 6.56; N, 3.90.

PREPARATION 4

α-Ethyl-α-phenyl-3-pyrrolidinemethanol

A solution of 79.5 g. (0.27 mole) of 1-benzyl-α-ethyl-α-phenyl-3-pyrrolidinemethanol in 150 ml. of 95% ethanol and 6 g. of 10% palladium-on-charcoal catalyst was heated to ca. 70° C. and shaken in an atmosphere of hydrogen until one equivalent of hydrogen was absorbed. After cooling, the suspension was filtered and the solvent was evaporated at reduced pressure. The residue which crystallized on cooling was fractionally recrystallized from isopropyl ether yielding 27 g. of product melting at 116–120° C. (α-isomer) and 5 g. melting at 101–105° C. (β-isomer). The yield was 58%.

Five grams of the higher melting isomer (α-isomer) was recrystallized from isopropyl ether yielding 3.8 g. of product melting at 118–120° C. A mixture of the isomers melted at 97–113° C.

Analysis.—Calculated for $C_{13}H_{19}NO$ (percent): C, 76.05; H, 9.33; N, 6.82. Found (α-isomer), percent: C, 76.26; H, 9.40; N, 6.87. (β-isomer), percent: C, 76.19; H, 9.36; N, 6.86.

PREPARATION 5

α-Methyl-α-phenyl-3-pyrrolidinemethanol

In the same manner as Preparation 4, hydrogenolysis of 1-benzyl-α-methyl-α-phenyl - 3 - pyrrolidinemethanol gave α-methyl-α-phenyl - 3 - pyrrolidinemethanol (B.P. 111–113° C./.02 mm.; M.P. 80–100° C.) in 59% yield.

Analysis.—Calculated for $C_{12}H_{17}NO$ (percent): C, 75.35; H, 8.96; N, 7.32. Found (percent): C, 75.18; H, 9.06; N, 7.37.

PREPARATION 6

α-Methyl-α-(p-trifluoromethylphenyl)-3-pyrrolidinemethanol

In the same manner as Preparation 4, hydrogenolysis of 1-benzyl - α - methyl-α-(p-trifluoromethylphenyl)-3-pyrrolidinemethanol gave α-methyl-α-(p-trifluoromethylphenyl)-3-pyrrolidinemethanol (B.P. 115–117° C./.005 mm.; M.P. 90–96° C.) in 81% yield.

Analysis.—Calculated for $C_{13}H_{16}F_3NO$ (percent): C, 60.22; H, 6.22; N, 5.40. Found (percent): C, 60.11; H, 6.40; N, 5.44.

PREPARATION 7

1-benzyl-2-oxo-α,α-diphenyl-3-pyrrolidinemethanol

A liquid ammonia solution containing 0.293 mole of lithium amide was prepared by reacting 2.03 g. (0.293 mole) of lithium metal with one liter of liquid ammonia using a catalytic amount of ferric chloride. 1-benzyl-2-pyrrolidinone (34.9 g.; 0.195 mole) was added slowly and the mixture stirred one hour following addition. An ether solution of 35.5 g. (0.195 mole) of benzophenone was added carefully and the resulting mixture was stirred one hour. The reaction mixture was treated with 16.04 g. (0.30 mole) of ammonium chloride with ether being added to replace the ammonia which evaporated. Evaporation of the ether solution left an oil which solidified on standing.

PREPARATION 8

1-benzyl-α,α-diphenyl-3-pyrrolidinemethanol

A solution of 47.2 g. (0.135 mole) of 1-benzyl-2-oxo-α,α-diphenyl-3-pyrrolidinemethanol in anhydrous tetrahydrofuran was added dropwise to a stirred gently refluxing suspension of 5.7 g. (0.15 mole) of lithium aluminum hydride in anhydrous tetrahydrofuran. The reaction mixture was decomposed with water after a one-hour reaction period. Sodium hydroxide solution (50%) was added to dissolve the alumina. The mixture was filtered using a filter aid and the filtrate concentrated to an oil which crystallized on cooling.

PREPARATION 9

1-benzyl-3-(m-trifluoromethylphenyl)-3-pyrrolidinol hydrochloride

In a three-liter, three-necked flask equipped with stirrer, dropping funnel and efficient condenser (system under nitrogen) were placed 17.0 g. (0.7 atom) of magnesium turnings, 200 ml. of dry ether and a crystal of iodine. After several milliliters of a solution of 158 g. (0.7 mole) of m-bromobenzotrifluoride in 200 ml. of dry ether was added, the reaction started and the remainder of the solution was added at a rate which maintained vigorous refluxing. After the addition was complete, stirring and refluxing was continued for one hour. The stirred Grignard solution was then cooled to −50° C. and maintained below that temperature while a solution of 86 g. (0.49 mole) of 1-benzyl-3-pyrrolidinone in 400 ml. of dry ether was added slowly. After the addition was complete, the mixture was stirred several minutes and then poured onto one liter of ice water containing 38 g. (0.7 mole) of ammonium chloride. The ether layer was separated, washed with water and dried over magnesium sulfate. After the solvent was evaporated, the residual oil was distilled at reduced pressure and the fraction distilling at 151–156° C./.01 mm. collected. The viscous oil weighed 66 g. (42% yield). Six grams was dissolved in ether and treated with an ether-hydrogen chloride solution. After the white solid which formed on standing was recrystallized several times from an isopropyl ether-isopropanol mixture, it weighed 4.1 g. and melted at 179.5–182° C.

*Analysis.*—Calculated for $C_{18}H_{19}ClF_3NO_3$ (percent): C, 60.42; H, 5.35; N, 3.92. Found (percent): C, 60.40; H, 5.29; N, 3.85.

PREPARATION 10

3-(m-trifluoromethylphenyl)-3-pyrrolidinol

A solution of 16.1 g. (0.05 mole) of 1-benzyl-3-(m-trifluoromethylphenyl)-3-pyrrolidinol in 200 ml. of ethanol and 5 g. of 10% palladium-on-charcoal catalyst was heated to ca. 70° C. and shaken in an atmosphere of hydrogen until one equivalent of hydrogen was absorbed. The cooled suspension was filtered and the filtrate concentrated. The residual oil which crystallized on cooling was recrystallized from a benzene-isooctane mixture. The pure white compound melted at 84.5–87° C. and weighed 8.1 g. (70% yield).

*Analysis.*—Calculated for $C_{11}H_{12}F_3NO$ (percent): C, 57.14; H, 5.23; N, 6.06. Found (percent): C, 57.05; H, 5.07; N, 6.19.

PREPARATION 11

3-(m-trifluoromethylphenyl)pyrrolidine hydrochloride

A solution of 11.5 g. (0.05 mole) of 3-(m-trifluoromethylphenyl)-3-pyrrolidinol in 200 ml. of 6 N hydrochloric acid and 4 g. of 10% palladium-on-charcoal catalyst was heated to ca. 70° C. and shaken in an atmosphere of hydrogen until one equivalent of hydrogen was absorbed. The cooled suspension was filtered and the filtrate made basic with 50% sodium hydroxide. The base insoluble oil was extracted with ether and the combined extracts were washed with water. After drying over magnesium sulfate the solvent was evaporated. The mobile residual oil weighed 7.1 g. (65% yield). A solution of three grams of the free base in ether was treated with an ether-hydrogen chloride solution. After the white solid which formed on standing was recrystallized from an isopropanol-isopropyl ether mixture, it melted at 111–113° C. and weighed 2.9 g.

*Analysis.*—Calculated for $C_{11}H_{13}ClNF_3$ (percent): C, 52.49; H, 5.21; N, 5.57. Found (percent): C, 52.34; H, 5.28; N, 5.54.

PREPARATION 12

1-benzyl-3-(2-methoxyanilino)pyrrolidine fumarate

The crude tosylate prepared from 3 moles of 1-benzyl-3-pyrrolidinol was dissolved in 500 g. of o-anisidine (practical) and the mixture was stirred and heated slowly under a nitrogen atmosphere until temperature reached 130° C. At this temperature a rapid exothermic reaction took place which raised the temperature rapidly to 160° C. After cooling with ice water back to 130° C. the mixture was allowed to stir for two hours. The temperature was raised to 160° C. and the mixture was stirred an additional two hours. After cooling to room temperature the mixture was dissolved in 3 N hydrochloric acid and extracted several times with ether. The acidic layer was neutralized with 50% sodium hydroxide and the resulting free base was extracted into chloroform. The chloroform extracts were dried over magnesium sulfate and evaporated under reduced pressure to an oil. The oil was fractionally distilled using a Vigreux column and yielded 335.7 g. (40%) of pure product which distilled at 174–175° C./0.02 mm. The oil solidified on standing but remelted slightly above room temperature. A mixture of 10 g. (0.0355 mole) of the amine in isopropanol was added to 4.1 g. (0.0355 mole) of fumaric acid in hot isopropanol. After cooling the oily salt slowly crystallized and gave 10.3 g. of salt melting at 145–147° C. An analytical sample recrystallized twice more from isopropanol melted at 146–148° C.

*Analysis.*—Calculated for $C_{22}H_{26}N_2O_5$ (percent): C, 66.31; H, 6.58; N, 7.03. Found (percent): C, 66.64; H, 6.78; N, 7.01.

PREPARATION 13

3-(2-methoxyanilino)pyrrolidine hexamate

Three 95 g. batches of 1-benzyl-3-(2-methoxyanilino)-pyrrolidine in 300 ml. of ethanol were catalytically reduced in a Paar apparatus using palladium-on-charcoal as catalyst. The mixture was heated to approximately 50° C. before reduction would take place. After the theoretical amount of hydrogen was taken up, the catalyst was filtered off and the solvent was evaporated. The pure product distilled at 110° C./0.02 mm.; yield 149 g. (77%). The oil solidified on standing. From five grams of the product a hexamate salt as prepared which, after three recrystallizations from isopropanol-isopropyl ether, melted 98–100° C. An additional recrystallization raised the melting point to 100–102° C.

The following examples show representative compounds contemplated by this invention and the manner in which such compounds are prepared. However, it is to be understood that these examples are intended for purposes of illustration only and are not intended as in any way limiting the scope of the invention.

EXAMPLE 1
1-[3-(4-fluorobenzoyl)propyl]-α-ethyl-α-phenyl-3-pyrrolidinemethanol A mixture of 7.0 g. (0.035 mole) of γ-chloro-4-fluorobutyrophenone, 7.2 g. (0.035 mole) of α-ethyl-α-phenyl-3-pyrrolidinemethanol, 10 g. of potassium carbonate and 100 ml. of toluene was stirred at reflux for 38 hours under an atmosphere of nitrogen. The cooled mixture was treated with 100 ml. of water, the organic layer separated and washed with cold water. The toluene solution was concentrated at reduced pressure, the residual oil was dissolved in benzene and chromatographed on 300 g. of 60–100 mesh magnesium silicate; the column was eluted with 1% methanol-benzene mixture. The product weighed 5.9 g. (46% yield).

*Analysis.*—Calculated for $C_{23}H_{28}NO_2F$ (percent): C, 74.44; H, 7.64; N, 3.79. Found (percent): C, 75.71; H, 7.61; N, 3.79.

EXAMPLE 2
1-(3-benzoylpropyl)-α-methyl-α-phenyl-3-pyrrolidinemethanol

A mixture of 14.5 g. (0.08 mole) of γ-chlorobutyrophenone, 15.3 g. (0.08 mole) of α-methyl-α-phenyl-3-pyrrolidinemethanol, 20 g. of potassium carbonate and 200 ml. of toluene was stirred at reflux for three days. The cooled suspension was treated with 200 ml. of cold water, the toluene layer separated, dried over magnesium sulfate and the toluene evaporated. The residual oil was distilled at reduced pressure and the fraction distilling at 200–202° C./.005 mm. collected. The light yellow, viscous oil weighed 8.1 g. (30% yield). Potentiometric titration showed 4.27% nitrogen (calculated, 4.15). An analytical sample was prepared by molecularly distilling a small amount of the product.

*Analysis.*—Calculated for $C_{22}H_{27}NO_2$ (percent): C, 78.30; H, 8.07; N, 4.15. Found (percent): C, 78.26; H, 8.05; N, 4.20.

EXAMPLE 3
1-[3-(4-fluorobenzoyl)propyl]-α-methyl-α-phenyl-3-pyrrolidinemethanol A mixture of 10.0 g. (0.05 mole) of γ-chloro-p-fluorobutyrophenone, 9.6 g. (0.05 mole) of α-methyl-α-phenyl-3-pyrrolidinemethanol, 20 g. potassium carbonate and 100 ml. of toluene was stirred and refluxed for two days. The cooled mixture was treated with 100 ml. of water, the toluene layer separated, the toluene evaporated and the residual oil chromatographed on 400 g. of 60–100 mesh magnesium silicate, eluting with a benzene-acetone mixture. The viscous oil weighed 9.2 g. (52% yield).

*Analysis.*—Calculated for $C_{22}H_{26}NO_2F$ (percent): C, 74.34; H, 7.37; N, 3.94. Found (percent): C, 74.22; H, 7.52; N, 3.80.

EXAMPLE 4
1-[3-(4-fluorobenzoyl)propyl]-α-methyl-α-(4-trifluoromethylphenyl)-3-pyrrolidinemethanol A mixture of 10.0 g. (0.05 mole) of γ-chloro-4-fluorobutyrophenone, 13.0 g. (0.05 mole) of α-methyl-α-(p-trifluoromethylphenyl)-3-pyrrolidinemethanol, 20 g. of potassium carbonate and 100 ml. of toluene was refluxed four days under an atmosphere of nitrogen. To the cooled solution was added 100 ml. of water, the toluene layer separated, the toluene evaporated, and the residual oil chromatographed on 450 g. of 60–100 mesh magnesium silicate, eluting with a benzene-acetone mixture. The viscous oil which remained after evaporation of the solvent, crystallized on standing and weighed 8.7 g. (41% yield). The solid melted at 92–95° C. after it was triturated with isopropyl ether.

*Analysis.*—Calculated for $C_{23}H_{25}F_4NO_2$ (percent): C, 65.23; H, 5.95; N, 3.31. Found (percent): C, 65.27; H, 5.99; N, 3.39.

EXAMPLE 5
1-(3-benzoylpropyl)-α-methyl-α-(4-trifluoromethylphenyl)-3-pyrrolidinemethanol A mixture of 10.4 g. (0.04 mole) of α-methyl-α-(4-trifluoromethylphenyl)-3-pyrrolidinemethanol, 7.3 g. (0.04 mole) of γ-chlorobutyrophenone, 20 g. of potassium carbonate and 100 ml. of toluene was refluxed five days under an atmosphere of nitrogen. To the cooled solution was added 100 ml. of water, the toluene layer separated, the solvent evaporated, and the residual oil dissolved in a warm isopropyl ether-isooctane mixture. The crystals which separated on cooling were collected by filtration and recrystallized from ligroin. The white compound weighed 3.5 g. (22% yield) and melted at 106–108° C.

*Analysis.*—Calculated for $C_{23}H_{26}F_3NO_2$ (percent): C, 68.13; H, 6.46; N, 3.46. Found (percent): C, 68.26; H, 6.54; N, 3.52.

EXAMPLE 6
1-(3-benzoylpropyl)-3-(3-trifluoromethylphenyl)pyrrolidine hydrochloride A mixture of 3.0 g. (0.014 mole) of 3-(m-trifluoromethylphenyl)pyrrolidine, 3.2 g. (0.014 mole) of 2-(3-chloropropyl)-2-phenyl-1,3-dioxolane, 10 g. of potassium carbonate and 60 ml. of 1-butanol was refluxed for 72 hours. The cooled suspension was filtered and the filtrate concentrated at reduced pressure. The residual oil was treated with 100 ml. of 6 N hydrochloric acid, the resulting suspension heated for several minutes and then made basic with 50% sodium hydroxide solution. The oil which separated was extracted with isopropyl ether and the combined extracts were washed with water. The solvent was evaporated and the residual oil weighed 3.6 g. (74% yield). The nuclear magnetic resonance spectrum and the infrared spectrum was consistent with the proposed structure. The free base was dissolved in ether and the solution was treated with ethereal hydrogen chloride. The white crystalline product melted at 143.5–146° C. after it was recrystallized from an isopropanol-isopropyl ether mixture.

*Analysis.*—Calculated for $C_{21}H_{24}ClF_3NO$ (percent): C, 63.39; H, 5.83; N, 3.52. Found (percent): C, 63.49; H, 5.87; N, 3.50.

EXAMPLE 7
1-[3-(4-fluorobenzoyl)propyl]-3-(3-trifluoromethylphenyl)pyrrolidine hydrochloride A mixture of 5.1 g. (0.025 mole) of γ-chloro-4-fluorobutyrophenone, 5.4 g. (0.025 mole) of 3-(3-trifluoromethylphenyl)pyrrolidine, 10 g. of potassium carbonate and 100 ml. of toluene was stirred and refluxed two days under an atmosphere of nitrogen. To the cooled solution was added 100 ml. of water, the toluene layer separated, the toluene evaporated, the residual oil distilled at reduced pressure and the fraction distilling at 180–183° C./0.5 mm. collected. The light yellow non-viscous oil weighed 2.5 g. (26% yield). The nuclear magnetic resonance spectrum was consistent with the proposed structure. A solution of the free base in ether was treated with ethereal hydrogen chloride solution and the white solid which formed on standing was collected and recrystallized from isopropanol-isopropyl ether mixture. The product melted at 134–136.5° C. and weighed 2.1 g.

*Analysis.*—Calculated for $C_{21}H_{22}ClF_4NO$ (percent): C, 60.65; H, 5.33; N, 3.37. Found (percent): C, 60.64; H, 5.31; N, 3.42.

EXAMPLE 8
1-(3-benzoylpropyl)-3-anilinopyrrolidine

A mixture of 20 g. (0.12 mole) of 3-anilinopyrrolidine, 20.2 g. (0.12 mole) of γ-chlorobutyrophenone and 20 g. of potassium carbonate in 200 ml. of dry toluene was refluxed with stirring under a nitrogen atmosphere for three days. The cooled mixture was treated with 200 ml. of water, stirred an additional 30 minutes and filtered to remove a small amount of insoluble material. The toluene layer was separated and stripped to an oil. The crude product was dissolved in chloroform and treated with 3 N hydrochloric acid in a separatory funnel. Three layers formed. The lower and middle layers were separately neutralized with base and extracted into chloroform. The extracts were dried over magnesium sulfate and stripped to an oil. The middle layer yielded 10 g. of nearly pure product which was molecularly distilled and analyzed. The lower layer yielded 19 g. of very impure product. Distillation of the impure oil at 217° C./0.05 mm. gave 9.0 of fairly pure product. The combined product fractions (19 g.) were further purified by chromatography the material on 400 g. of 60–100 mesh magnesium silicate. Pure product began eluting with 5% acetone-benzene. The resulting pure product crystallized when triturated with petroleum ether (30–60° C.); yield 15 g. (44%); M.P. 58–60° C.

*Analysis.*—Calculated for $C_{20}H_{24}N_2O$ (percent): C, 77.88; H, 7.84; N, 9.08. Found (percent): C, 77.92; H, 7.51; N, 9.11.

EXAMPLE 9

1-[3-(4-fluorobenzoyl)propyl]-3-anilinopyrrolidine

A mixture of 20 g. (0.12 mole) of 3-anilinopyrrolidine, 22.2 g. (0.11 mole) of γ-chloro-4-fluorobutyrophenone and 20 g. of potassium carbonate in 200 ml. of dry toluene was refluxed with stirring under a nitrogen atmosphere for three days. The reaction mixture was filtered to remove inorganic material and the filtrate was evaporated under reduced pressure to an oil (39.5 g.). The oil was dissolved in benzene and chromatographed on a 550 g. magnesium silicate column (60–100 mesh). Elution with benzene containing increasing amounts of acetone gave 19.1 g. (53%) of pure product. An analytical sample of the viscous oil was obtained by a molecular distillation.

*Analysis.*—Calculated for $C_{20}H_{23}FN_2O$ (percent): C, 73.59; H, 7.10; N, 8.58. Found (percent): C, 73.43; H, 7.11; N, 8.73.

EXAMPLE 10

1-(3-benzoylpropyl)-3-(N-propionyl-anilno)pyrrolidine

A solution of 8 g. (0.025 mole) of 1-(3-benzoylpropyl)-3-anilinopyrrolidine in 75 ml. of chloroform was treated with 15 g. of potassium carbonate. The stirred mixture was then treated dropwise with 3 g. (0.032 mole) of propionyl chloride in 35 ml. of chloroform and allowed to stir for 16 hours. The mixture was treated with 100 ml. of water and stirred an additional hour. The chloroform layer was separated, dried over magnesium sulfate and stripped to an oil. The oil distilled at 230° C./0.01 mm.; yield 7.4 g. (78%).

*Analysis.*—Calculated for $C_{23}H_{28}N_2O_2$ (percent): C, 75.79; H, 7.74; N, 7.69. Found (percent): C, 75.77; H, 7.88; N, 7.82.

EXAMPLE 11

1-[3-(4-fluorobenzoyl)propyl]-3-(N-propionyl-anilino)pyrrolidine

A solution of 8.5 g. (0.026 mole) of 1-[3-(4-fluorobenzoyl)propyl]-3-anilinopyrrolidine in 75 ml. of chloroform was treated with 15 g. of potassium carbonate. To the stirred mixture was added dropwise 2.5 g. (0.027 mole) of propionyl chloride in 35 ml. of chloroform. The mixture was allowed to stir at room temperature under a nitrogen atmosphere over a weekend, then 80 ml. of water and 10 ml. of 3 N sodium hydroxide was added and the mixture was stirred another 30 minutes. The chloroform layer was separated, dried over magnesium sulfate and evaporated under reduced pressure to an oil (9.1 g.). The oil was dissolved in benzene and chromatographed on 200 g. of 60–100 mesh magnesium silicate. The column was eluted with benzene containing increasing amounts of acetone. Pure product was eluted between 2 and 40% acetone concentration; yield 6.7 g. (68%).

*Analysis.*—Calculated for $C_{23}H_{27}FN_2O$ (percent): C, 72.22; H, 7.12; N, 7.33. Found (percent): C, 71.79; H, 6.92; N, 7.19.

EXAMPLE 12

1-[3-(4-fluorobenzoyl)propyl]-3-(2-methoxy-anilino)pyrrolidine fumarate

A stirred mixture of 10 g. (0.052 mole) of 3-(2-methoxyanilino)pyrrolidine, 12.7 g. (0.054 mole) of 2-(3-chloropropyl)-2(4-fluorophenyl)-1,3-dioxolane, 12 g. of powdered potassium carbonate and 125 ml. of 1-butanol was allowed to reflux for 24 hours. The mixture was cooled, filtered and the filtrate was evaporated to an oil. The oil was dissolved in benzene and the basic material was extracted into 3 N hydrochloric acid. After combining the acidic extracts, they were treated with 3 N sodium hydroxide until basic and the resulting free base was taken into benzene. The benzene extracts were dried over magnesium sulfate and evaporated to an oil (13 g.). The amine was converted to a fumarate salt which was recrystallized twice from acetone; yield 8 g. (25%); M.P. 120–123° C.

*Analysis.*—Calculated for $C_{25}H_{29}FN_2O_6$ (percent): C, 63.54; H, 6.19; N, 5.92. Found (percent): C, 63.49; H, 6.24; N, 5.98.

EXAMPLE 13

1-(2-benzoylethyl)-3-anilinopyrrolidine dihydrochloride

A mixture of 13.2 g. (0.062 mole) of 2-benzoylethyldimethylamine hydrochloride, 10 g. (0.062 mole) of 3-anilinopyrrolidine and 10 g. of potassium carbonate was stirred together in dimethylformamide while a stream of nitrogen was bubbled through the mixture to remove the dimethylamine as it was formed. After 24 hours, 250 ml. of water was added to the mixture and the oily product was extracted into benzene. The benzene extracts were washed several times with water to remove residual dimethylformamide, dried over magnesium sulfate and stripped to an oil (18 g.). The oil was converted to a dihydrochloride which was recrystallized from isopropanol; yield 15.5 g. (68%), M.P. 175–178° C. (dec.).

*Analysis.*—Calculated for $C_{19}H_{24}Cl_2N_2O$ (percent): C, 62.12; H, 6.59; N, 7.63. Found (percent): C, 62.02; H, 6.68; N, 7.74.

EXAMPLE 14

1-(2-benzoylethyl)-α-methyl-α-phenyl-3-pyrrolidinemethanol

A mixture of 10.6 g. (0.05 mole) of 2-benzoylethyldimethylamine hydrochloride, 9.6 g. (0.05 mole) of α-methyl-α-phenyl-3-pyrrolidinemethanol and 10 g. of potassium carbonate was stirred in 75 ml. of dimethylformamide at 40° C. while a stream of nitrogen was bubbled through the mixture. After 18 hours the mixture was treated with 400 ml. of water and the oily product was extracted into chloroform. The chloroform extracts were shaken with 3 N hydrochloric acid but the amine hydrochloride remained in the chloroform layer. The free base was regenerated by shaking the chloroform extracts with 3 N sodium hydroxide; the chloroform was removed by evaporation. The resulting oil was taken up in ether and extracted with water to remove traces of dimethylformamide. The ether layer was dried over magnesium sulfate and evaporated under reduced pressure to an oil (14 g., 83%). A portion of the product was purified further by chromatographing on a magnesium silicate column using acetone-benzene to elute.

*Analysis.*—Calculated for $C_{21}H_{25}NO_2$ (percent): C, 77.98; H, 7.79; N, 4.33. Found (percent): C, 77.56; H, 7.83; N, 4.34.

EXAMPLE 15

1-(2-benzoylethyl)-3-(N-propionylanilino)pyrrolidine

A stirred mixture of 18 g. (0.062 mole) of 1-(2-benzoylethyl)-3-anilinopyrrolidine and 18 g. of potassium carbonate in 100 ml. of chloroform was treated dropwise with 6 g. (0.065 mole) of propionyl chloride in 50 ml. of chloroform. After addition, the mixture was stirred two hours, 200 ml. of water was added and stirring continued for another hour. The chloroform layer was separated, dried over magnesium sulfate and stripped to an oil (21 g.). The oil was taken up in hot isooctane, charcoaled, filtered and cooled. The pure product which precipitated, 14 g. (65%), melted at 71–73° C. An analytical sample melted at 72–74° C. after recrystallization from the same solvent.

*Analysis.*—Calculated for $C_{22}H_{26}N_2O_2$ (percent): C, 75.39; H, 7.48; N, 7.99. Found (percent): C, 75.18; H, 7.39; N, 8.07.

EXAMPLE 16

1-(2-benzoylethyl)-3-(2-methoxyanilino)pyrrolidine dihydrochloride

A stirred mixture of 13.3 g. (0.06 mole) of 2-benzoylethyl dimethylamine hydrochloride, 12 g. (0.062 mole) of 3-(2-methoxyanilino)pyrrolidine and 10 g. of potassium carbonate in 75 ml. of dimethylformamide was heated at 50–60° C. for six hours while a stream of nitrogen was bubbled through the mixture. The mixture was poured into 300 ml. of water and extracted with two 300 ml. portions of benzene. The benzene extracts were washed with two 200 ml. portions of water, dried over magnesium sulfate and stripped to an oil. The oil was dissolved in isopropanol and treated with ethereal hydrochloric acid. The resulting salt, 21.6 g. (87%), melted at 192–194° C. An analytical sample recrystallized from absolute alcohol had the same melting point.

*Analysis.*—Calculated for $C_{20}H_{26}Cl_2N_2O_2$ (percent): C, 60.45; H, 6.60; N, 7.06. Found (percent): C, 60.45; H, 6.83; N, 7.09.

EXAMPLE 17

1-(2-benzoylethyl)-3-[N-propionyl-(2-methoxyanilino)]pyrrolidine

A stirred solution of 10 g. (0.031 mole) of 1-(2-benzoylethyl)-3-(2-methoxyanilino)pyrrolidine in 50 ml. of chloroform containing 10 g. of potassium carbonate was treated dropwise with 3.2 g. (0.034 mole) of propionyl chloride in 25 ml. of chloroform. After stirring two hours the mixture was poured into 200 ml. of water. The chloroform layer was separated, dried over magnesium sulfate and stripped to an oil (12 g.). The oil showed a single spot on thin layer chromatography.

*Analysis.*—Calculated for $C_{23}H_{28}N_2O_3$ (percent): C, 72.60; H, 7.42; N, 7.36. Found (percent): C, 72.07; H, 7.10; N, 7.53.

Formulation and administration

Effective quantities of any of the foregoing pharmacologically active compounds may be administered to a living animal body in any one of various ways, for example, orally as in capsules or tablets, parenterally in the form of sterile solutions or suspensions, and in some cases intravenously in the form of sterile solutions. The free basic amino compounds, while effective, are preferably formulated and administered in the form of their non-toxic acid-addition salts for purposes of convenience of crystallization, increased solubility, and the like.

Although very small quantities of the active materials of the present invention, even as low as 0.1 milligram, are effective when minor therapy is involved or in cases of administration to subjects having a relatively low body weight, unit dosages are usually five milligrams or above and preferably twenty-five, fifty or one hundred milligrams. Five to fifty milligrams appears optimum per unit dose, while usual broader ranges appear to be one to 500 milligrams per unit dose. The active agents of the invention may be combined with other pharmacologically active agents, or with buffers, antacids or the like, for administration and the proportion of the active agent in the compositions may be varied widely. It is only necessary that the active ingredient constitute an effective amount, i.e., such that a suitable effective dosage will be obtained consistent with the dosage form employed. Obviously, several unit dosage forms may be administered at about the same time.

Examples of compositions within the preferred ranges given are as follows:

Capsules

| Ingredients: | Per cap., mg. |
|---|---|
| (1) Active ingredient, as salt | 10.0 |
| (2) Lactose | 146.0 |
| (3) Magnesium stearate | 4.0 |

Procedure
(1) Blend 1, 2, and 3.
(2) Mill this blend and blend again.
(3) This milled blend is then filled into No. 1 hard gelatin capsules.

Tablets

| Ingredients: | Mg./tab., mg. |
|---|---|
| (1) Active ingredient, as salt | 5.0 |
| (2) Corn starch | 13.6 |
| (3) Corn starch (paste) | 3.4 |
| (4) Lactose | 79.2 |
| (5) Dicalcium phosphate | 68.0 |
| (6) Calcium stearate | 0.9 |
| | 170.1 |

Procedure
(1) Blend 1, 2, 3, 4 and 5.
(2) Add sufficient water portionwise to the blend from Step No. 1 with careful stirring after each addition. Such additions of water and stirring continue until the mass is of a consistency to permit its conversion to wet granules.
(3) The wet mass is converted to granules by passing it through the oscillating granulator, using 8-mesh screen.
(4) The wet granules are then dried in an oven at 140° F.
(5) The dried granules are then passed through an oscillating granulator, using a 10-mesh screen.
(6) Lubricate the dry granules with 0.5% magnesium stearate.
(7) The lubricated granules are compressed on a suitable tablet press.

Intramuscular injection

| Ingredients: | Per ml. |
|---|---|
| (1) Active ingredient, as salt | 10.0 mg. |
| (2) Isotonic buffer solution 4.0 | q.s. to 2.0 ml. |

Procedure
(1) Dissolve the active ingredient in the buffer solution.
(2) Aseptically filter the solution from step No. 1.
(3) The sterile solution is now aseptically filled into sterile ampoules.
(4) The ampoules are sealed under aseptic conditions.

Various modifications and equivalents will be apparent to one skilled in the art and may be made in the compounds, methods, compositions, and procedures of the present invention without departing from the spirit or scope thereof, and it is therefore to be understood that the invention is to be limited only by the scope of the appended claims.

What is claimed is:

1. A compound selected from the group consisting of 1-(ω-benzoylalkyl)-3-substituted pyrrolidines having the formula:

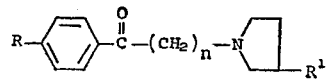

wherein;
R is selected from the group consisting of hydrogen and fluorine,
$R^1$ is selected from the group consisting of —$N(R^2)$phenyl and —$C(OH)(R^2)$phenyl, wherein $R^2$ is selected from the group consisting of hydrogen, lower-alkyl and lower-alkanoyl,
wherein phenyl is the unsubstituted phenyl radical and the monosubstituted phenyl radical wheerin the monosubstituent is selected from the group consisting of lower alkoxy, trifluoromethyl and halogen,
$n$ is a positive integer from 2 to 3 inclusive, and pharmaceutically acceptable acid-addition salts thereof.

2. A compound of claim 1 which is 1-[3-(4-fluorobenzoyl)propyl]-α-ethyl-α-phenyl-3-pyrrolidinemethanol.

3. A compound of claim 1 which is 1-[3-(4-fluorobenzoyl)propyl]-α-methyl - α - (4-trifluoromethylphenyl)-3-pyrrolidinemethanol.

4. A compound of claim 1 which is 1-(3-benzoylpropyl)-α-methylphenyl-α-(4-trifluoromethyl) - 3 - pyrrolidinemethanol.

5. 1-(3-benzoylpropyl) - 3 - (3-trifluoromethylphenyl)pyrrolidine.

6. 1-(3-(4-fluorobenzoyl)propyl] - 3 - (3-trifluoromethylphenyl)pyrrolidine.

7. A compound of claim 1 which is 1-[3-(4-fluorobenzoyl)propyl]-3-(2-methoxyanilino)pyrrolidine.

8. A compound of claim 1 which is 1-(2-benzoylethyl)-3-(N-propionylanilino)pyrrolidine.

9. A compound of claim 1 which is 1-(2-benzoylethyl)-3-[N-propionyl-(2-methoxy)anilino]pyrrolidine.

References Cited

El'tsov et al.: Chemical Abstracts 62: 3995 (1965).
Lunsford et al.: Chemical Abstracts 70: 6812w (1969), abs. of S. Afr. Pat. No. 6,705, 136.

ALEX MAZEL, Primary Examiner

J. A. NARCAVAGE, Assistant Examiner

U.S. Cl. X.R.

260—326.3, 326.5 R, 326.5 FL; 424—274

UNITED STATES PATENT OFFICE
CERTIFICATE OF CORRECTION

Patent No. 3,651,085          Dated March 21, 1972

Inventor(s) Carl Dalton Lunsford, et al

It is certified that error appears in the above-identified patent and that said Letters Patent are hereby corrected as shown below:

Column 1, line 49, change "rarical" to --radical--; line 71, change "dependnig" to --depending--. Column 4, line 15, change "nalts" to --salts--; line 24, change "carbanote" to --carbonate--. Column 10, line 42, change "$H_{24}$" to --$H_2s$--. Column 11, line 13, change "chromatography" to --chromatographing--. Column 15, line 9, change "wheerin" to --wherein--;

Signed and sealed this 7th day of November 1972.

(SEAL)
Attest:

EDWARD M. FLETCHER, JR.
Attesting Officer

ROBERT GOTTSCHALK
Commissioner of Patents